United States Patent Office 2,732,763
Patented Jan. 31, 1956

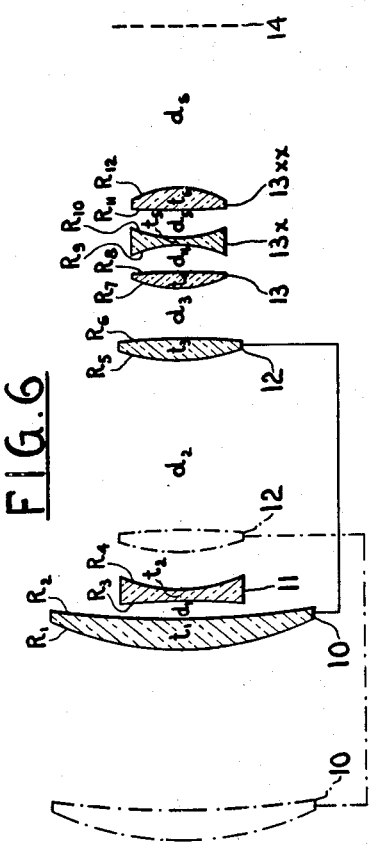

2,732,763

VARIFOCAL LENS CONSTRUCTIONS AND DEVICES

Frank G. Back and Herbert Lowen, Glen Cove, N. Y.; said Lowen assignor to said Back Application July 21, 1953, Serial No. 369,440

2 Claims. (Cl. 88—57)

The present invention relates to varifocal lenses for television cameras. The mechanical and optical features of these lenses provide for improved and novel utility by which a definite simplification in their use is accomplished.

The specific function and purpose of varifocal lenses is well known in the art. The present invention provides furthermore for a novel optical arrangement by means of which the required number of lens elements, which was requisite in conventional varifocal lenses, has been reduced therefore reducing the loss of light transmission, experienced in conventional equipment.

U. S. Patent 2,454,686 to Frank G. Back and an improvement thereupon, set forth in our copending application S. N. 315,088, filed October 16, 1952, and now U. S. Patent 2,718,817 dated September 27, 1955, illustrate varifocal lens-constructions, certain further improvements over which are now hereinafter set forth.

It is according to the foregoing the basic object of the present invention to present a new and improved construction for a varifocal lens for specific use in the television industry which combines improvements in the mechanical construction and the optical arrangement thereof so as to represent a new and improved piece of equipment of this type.

It is an object of the present invention to provide for a novel mechanical construction, which permits the two operations, which must be performed for the purpose of proper use of the varifocal lens, to be accomplished by means of an arrangement which can be manipulated by one hand of the operator so that the other hand of the operator is free for use as otherwise required. Accordingly the close-up focusing and zooming by means of one single lever, operable with one hand is accomplished, while the other hand of the operator is available for the movement of the camera so that both camera and the camera's varifocal lens can be handled and can be handled simultaneously yet independently by the operator.

It is a further object of the present invention to provide a novel optical arrangement for a varifocal lens, which differs from the heretofore set forth optical arrangements in so far as the required number of optical lens elements has been reduced without affecting the effectiveness and character of the varifocal lens into which said novel optical arrangement is incorporated.

It is a further object of the present invention to provide a new and novel varifocal lens having fewer optical elements, than heretofore required for such varifocal lenses, wherein the reduction of optical elements correspondingly reduces the loss of light-transmission. Accordingly in the present invention a new optical arrangement for varifocal lenses is set forth in which the loss of light-transmission, heretofore inherent to such devices is substantially reduced.

It is according to the foregoing as such, a further object of the present invention to provide a new optical arrangement for varifocal lenses, differing from the varifocal lenses set forth in U. S. Patent 2,454,686 and patent-application S. N. 315,088 of October 16, 1952, in its optical construction by consisting of two stationary lens groups and two movable lens groups wherein the elimination of one stationary lens group while not affecting the accomplishments of the conventional device adversely it indeed improves over the performance thereof substantially.

The foregoing objects and other advantages of the present invention will in part be obvious and in part be set forth in detail on hand of the detailed drawings and description of a preferred embodiment thereof.

In the accompanying drawings, a preferred embodiment of the present invention is shown in which:

Fig. 6 is a schematic view showing the movable lens systems in two extreme positions illustrating the relative relation between movable and fixed lens members in the course of the movement.

Fig. 7 is a table exemplifying the values and character of each of the optical elements and specifying their spacial relations to each other.

In the herebelow set forth description, the optical arrangement posessing the advantages accomplished by the reduction of the required lens elements is first described in detail. The mechanical arrangement, by means of which it is possible to accomplish operation of the varifocal lens, by means of one hand, leaving the other hand of the operator free for handling camera or carriage, is detailed thereafter.

As will be obvious, the present invention combines an improvement in the optical arrangement with a novel mechanical construction.

Figure 4:
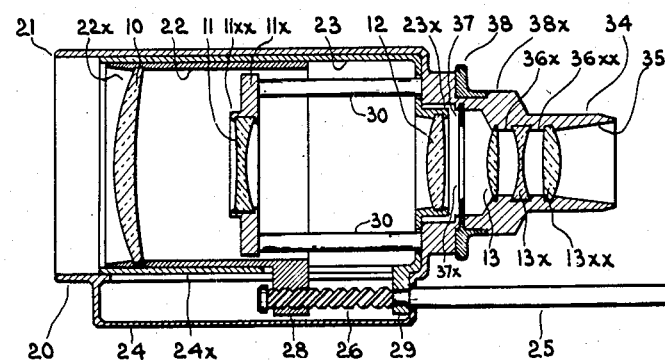
Fig. 4 is a view along the lines of Fig. 2, the elements being adjusted to a wide angle position at a finite distance.
Figure 5:
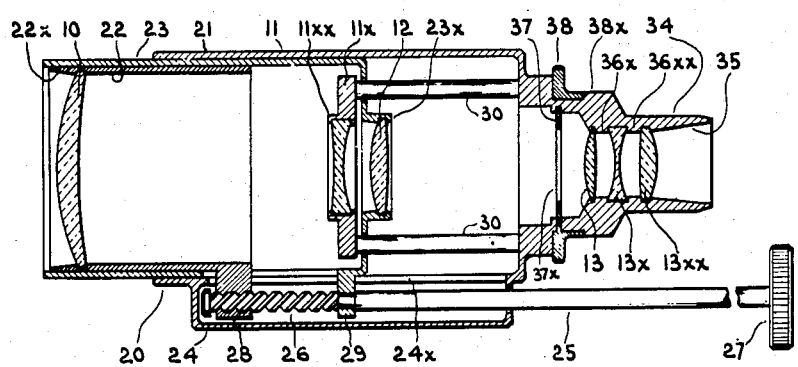
Fig. 5 is a view along the lines of Fig. 4, the elements being adjusted to a telephoto position at a finite distance.

The lens system in accordance with the present invention comprises the following lens elements as illustrated in Fig. 4 schematically: The variator lens 10 and the compensator lens 12, which both constitute the movable lens elements of the varifocal lens system. The two lenses 10 and 12 are so arranged that the compensator lens 12 is positioned at a fixed distance rearward of the variator lens 10 and when the said lenses are moved relative to the fixed lens elements of the varifocal lens system, their relative position with respect to each other, is maintained. The erector lens 11 is fixedly positioned between the variator lens 10 and the compensator lens 12 and the relay 13, 13x and 13xx is fixedly positioned behind the compensator lens 12. The two lenses respectively optical elements 11 and 13, 13x and 13xx constitute the stationary lens elements of the varifocal system.

When the movable lens elements, the variator 10 and the compensator 12 are moved relative to the fixed lens elements, the erector 11 and the relay 13, 13x and 13xx, the variation in spacing between fixed and movable lens elements by this relative movement within the mechanically prescribed limits will either constitute the total optical system to act as a telephoto system or as a wide angle system.

The function of each of the individual optical components of the herein above set forth varifocal lens system is as follows: Variation and close-up focusing is accomplished by the variator lens 10; the erector lens 11 takes the real, inverted image of the variator lens 10 as its virtual object and forms a virtual, upright image thereof; the compensator lens 12 takes the said, virtual, upright image of the erector lens 11 as its real object and forms a real, inverted, stationary image thereof which remains fixed in its position relative to the relay 13, 13x and 13xx; the relay 13, 13x and 13xx, takes the real, inverted, stationary image, formed by the compensator lens 12, and taking said real, inverted, stationary image as virtual object, forms therefrom a real, inverted image of desired or required size.

When the movable lens elements, the variator lens 10 and the compensator 12 are used for zooming, the distance between said movable lens elements remains throughout most zoom procedures stationary and likewise the distance between each of the fixed, stationary elements, the erector lens 11 and the relay lenses 13, 13x and 13xx remains fixed so that in the operative aspect of a zoom the position of the compensator 12 relative to erector 11 and to the relay 13, 13x and 13xx and the position of the variator 10 relative to the erector 11 is changed. The change which accordingly occurs in the relative positions of the lens members is such that during the zoom the distance between the variator 10 and the erector 11 will be increased by the same amount by which the distance between the compensator 12 and the relay 13 increases and the distance between the compensator 12 and the erector 11 decreases and vice versa.

While the relationship and spacial distancing between the stationary, fixed optical components of the system, the compensator 11 and the relay 13 remains absolutely fixed, provision is made to permit a small amount of variation in the lateral spacing distance between the variator 10 and the compensator 12 by providing for a certain amount of linear, lateral movement of the variator 10 so that a certain amount of adjustment of the spacing between variator and compensator is possible. This feature, the independent adjustment of spacing between the two movable lens components of the herein set forth varifocal lens system, permits the close-up focusing to be accomplished and in adapting the present invention to certain specific uses, peculiar, particularly to television, this arrangement is of specific benefit. For instance when the zoom step, the variation of the distances between the stationary elements and the movable elements takes place, it is possible, by varying at the same time the distance, between the two movable elements (variator 10 and compensator 12) to take certain shots, i. e., shots in zoom where the object moves itself during the zoom and throughout the zoom-period. Furthermore as stated before the relative ability of the variator 10 to move with respect to the compensator 12 naturally permits for close-up focusing by means of the variator, eliminating the necessity for additional lens elements, heretofore often required.

The compensation of all lens elements, movable and fixed, with relation to each other, is maintained in such manner that sharp focusing is continuously accomplished throughout the entire zoom, i. e. in every possible position of the lens system. This is effected by the compensator 12 which has to have the following characteristics: if $m$ be the movement of the lens barrel; $t$ be the travel of the virtual, upright image formed by the erector 11; $f$ be the focal length of the compensator 12; and $L$ be the distance from said virtual upright image to the compensator 12 (when the variator 10 is in its most forward position); and $L'$ be the distance of the real image (formed by the compensator 12 from said virtual image of erector 11) than the equation:

$$\frac{1}{L-(m-t)}+\frac{1}{f}=\frac{1}{L'-m}$$

has to be fulfilled for every possible position of the movable lens barrel, or the focal length of the compensator 12, and its spacing in the optical system must be so chosen, that in the event the object distance of the lens be changed by an amount of $m-t$, the image distance will be changed by the amount of $m$.

The optics shown and illustrated in the drawings, set forth in Figs. 2, 3, 4, 5, schematically in Fig. 6 and shown in the table in Fig. 7 have the following values:

| Lens | Glasses | Radii | Thickness or Separation |
| --- | --- | --- | --- |
| Variator 10 | BSC; $N_D=1.517$; $V=64.5$. | $R_1=+122.68$ $R_2=+939.28$ | $t_1=12.00$. $d_1$ variable from 5.17 to 80.17 Separation. |
| Erector 11 | DF; $N_D=1.605$; $V=37.9$. | $R_3=-307.00$ $R_4=+61.71$ | $t_2=4.00$. $d_2$ variable from 87.50 to 12.50 Separation. |
| Compensator 12 | DBC; $N_D=1.611$; $V=58.8$. | $R_5=+71.50$ $R_6=-939.28$ | $t_3=8.50$. $d_3$ variable from 20.70 to 95.70 Separation. |
| Relay 13 | DBC; $N_D=1.611$; $V=58.8$. | $R_7=+45.41$ $R_8=-424.00$ | $t_4=6.00$. $d_4$ variable from 9.50 Separation. |
| Relay 13x | DF; $N_D=1.621$; $V=36.2$. | $R_9=-45.00$ $R_{10}=+45.00$ | $t_5=1.80$. $d_5=9.70$ Separation. |
| Relay 13xx | DBC; $N_D=1.611$; $V=58.8$. | $R_{11}=+1917.00$ $R_{12}=-36.43$ | $t_6=8.00$. $d_6=60.50$ Back focal length. |

BSC=borosilicate crown: DF=dense flint; DBC=dense barium crown. $N_D=$ for Na at 5893 A; V=Abbé's dispersion number; R=radius of curvature; and radii, thickness and spacings are given in mm. (millimeters).

For the purpose of exemplification of the varifocal lens system specific data for the optics have been set forth, it being understood that these data are set forth for the purpose of exemplification only and as such they are recited by way of illustration not to be construed as constituting a limitation of the optical arrangement exemplified thereby. The basic requirement of these optics is merely limited by the fact that the variator 10 and the compensator 12 move as an integral unit relative to the fixed stationary members of the optic i. e. the erector 11 and the relays 13, 13x and 13xx for the accomplishment of a zoom effect. Furthermore the relationship expressed for the characteristics of the compensator lens 12 as:

$$\frac{1}{L-(m-t)}+\frac{1}{f}=\frac{1}{L'-m}$$

has to be maintained.

While it has been set forth and stated that the variator 10 and the compensator 12 constitute a relatively fixed unit, movable for the purpose of zooming, as such so that the spacing between the variator 10 and the compensator 12 remains fixed during the zoom and the spacing between these two elements and the fixed elements is altered during the zoom, it is nevertheless understood, that for the purpose of close-up-focusing the spacing between the variator 10 and the compensator 12 can be altered and the variator 10 can accordingly be moved, to accomplish close-up-focusing, relative to the compensator 12, this movement however is only affecting the relation between the two aforenamed members, and does not directly affect the zoom, which is accomplished solely by the alteration between the relative distances of fixed members (erector and relays) and movable members (variator and compensator) as units per se.

While in the foregoing description the word "lens" has been employed for the purpose of easy expression and clear presentation it is to be understood that both single and multiple elements are understood to be encompassed by the said term "lens" as here employed.

As evident from the foregoing detailed description of one preferred form of the optical arrangement, required in accomplishing the objects of the present invention, a mechanical arrangement is required to permit the functioning of the said optical arrangement.

Figure 1:
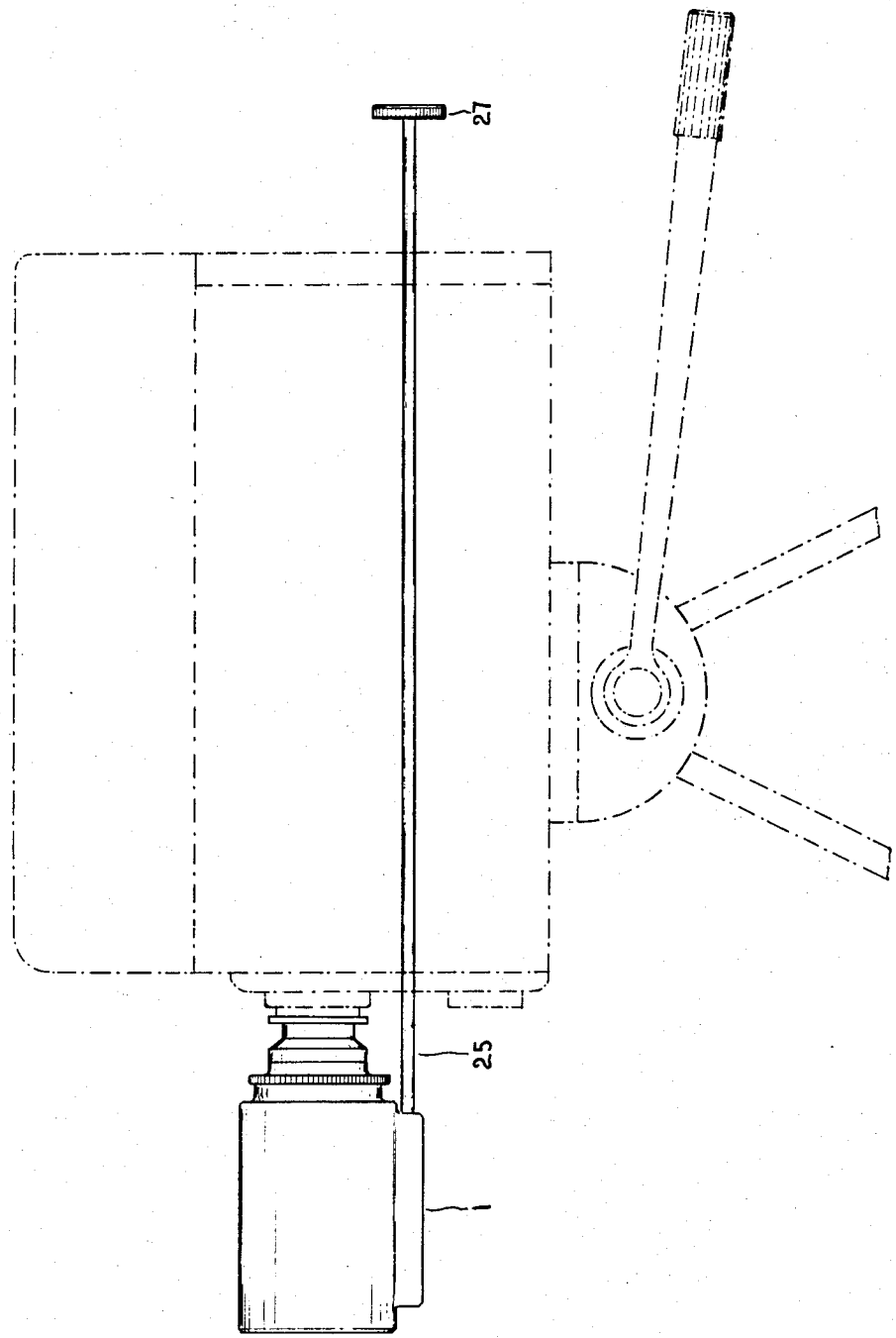
Fig. 1 is a side elevational view showing a varifocal lens of the type herein set forth, in position on a camera.
Figure 2:
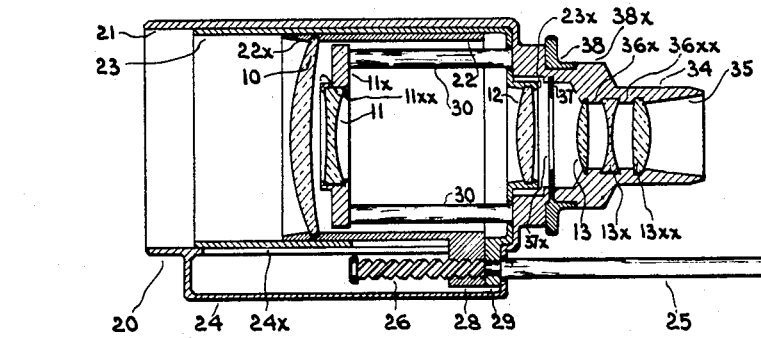
Fig. 2 is a longitudinal section through the entire system showing the control mechanism by means of which the movable optical elements are adjusted to a wide angle position at infinity.

The mechanical arrangement, hereinafter described, is set forth and illustrated in the accompanying drawings and its specific features are detailed in Figs. 2 and 3 it being understood here, that for the purpose of proper illustration, one preferred form of said arrangement is set forth, without thereby limiting the scope of the present invention thereto.

Figure 3:
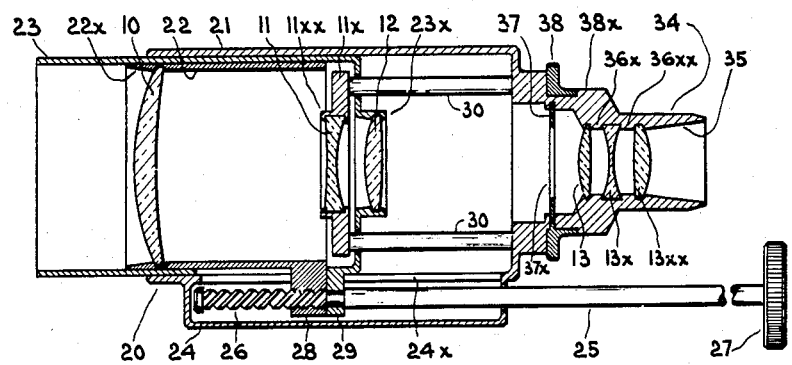
Fig. 3 is a view identical to Fig. 2 the elements being adjusted to a telephoto position at infinity.

Having now particular reference to Fig. 3 it will be noted that a housing 20 is provided into which the optical and mechanical arrangements are fitted. The inner configuration of the housing 20 is arranged so as to constitute the lens-barrel 21. Within the lens barrel 21 and slideably engaging in its outer periphery there are arranged the variator mount 22 and the compensator mount 23 into which the variator lens 10 and the compensator lens 12 are positioned and fixed by means of the variator retainer 22x and the compensator retainer 23x. Extending parallel with said lens barrel 21 in the upper portion of said housing 20 a cylindrical, open portion 24 is provided, which is substantially coextensive with said lens barrel 21. Said open, cylindrical portion 24 is open on one side thereof and communicates via an open slit 24x arranged in its floor with the lens barrel 21 as the said slit 24x extending along the entire length of the said floor of the cylindrical portion 24 also bisects the top of said lens barrel 21.

The zoom rod 25 and the control-shaft 26 which are arranged to form one, substantially integral unit are slideably and rotatably positioned within the cylindrical portion 24 extending through its open outer end to form handle means 27. Along the zoom-or-control shaft, respectively, rod within said cylindrical portion 24 and in contact with its side walls control brackets 28 and 29 are arranged, which control brackets extend through the slit 24x into the lens barrel 21 engaging simultaneously with the zoom-rod 25, the control shaft 26 and respectively with the variator mount 22 and the compensator mount 23. When the zoom-rod 25 is pushed forward or pulled back, by the engagement of the lens-mounts 22 and 23 through control brackets 28 and 29 therewith, the movement accordingly transmitted to the variator lens 10 and compensator lens 12 causes the lenses 10 and 12 to travel through the identical path and to the same extent as the zoom-rod 25 as the control brackets 28 and 29 engage the lens mounts 22 and 23. The position of the control-brackets 28 and 29 is substantially fixed except that the control-bracket 28 can be moved by rotational movement on its axis, which is formed by the control-shaft 26, which it circumscribes. This movement is imparted to the variator-mount 22 permitting an adjustment of the relative distance and spacing between the variator lens 10 and the compensator lens 12 and provides accordingly for close-up-focusing. The control-bracket 29, also circumscribing the control-shaft 26 and the zoom-rod 25 is permanently fixed to the same so that the only movement imparted thereby to the compensator lens mount 23 is solely the zoom-movement transmitted from the zoom rod movement.

The zoom-movement is accordingly imparted to both the variator 10 and the compensator 12 by pushing or pulling the zoom-rod 25 within its housing i. e. along the space formed by the cylindrical, open portion 24; the control-brackets fixedly spaced and circumscribing said zoom-rod 25 and inter-engaging with the lens-mounts transmit said motion to the lenses i. e. the variator 10 and the compensator 12 by the inter-engagement, through slit 24x with the variator mount 22 and compensator mount 23 causing a movement of the variator 10 and compensator 12 in the lens-barrel 21 which is coextensive with the movement of the zoom-rod 25.

The close-up focusing, as set forth in detail in the consideration of the optics, hereinabove, required a relative variation with respect to the spacing between the variator 10 and the compensator 12.

This is accomplished in the present preferred form of the invention, by movement of the variator 10 while as accordingly obvious, the position of the compensator 12 remains fixed, except where it is moved jointly with the variator 10 for a proportional and coextensive movement i. e. the zoom.

The fixed lens members of the herein set forth varifocal lens system comprised of the erector lens 11 and the relay composed of relay lenses 13, 13x and 13xx are arranged within the lens barrel 21 in such manner that the said erector lens 11 is fixedly positioned therewithin, between the variator lens 10 and the compensator lens 12 being mounted in position by means of the erector mount 11x and the erector retainer 11xx. The relay lenses 13, 13x and 13xx are fixedly positioned behind the compensator lens 12. They are mounted by means of the relay mount 34 and the relay retainer 35 and the spacers 36x and 36xx. In front of the relay 13 the diaphragm 37' which is of such character as to provide a variable aperture 37x' is positioned by means of diaphragm ring which is held in position by diaphragm-ring-retainer 38x. The aperture opening is controlled by a control screw.

While in the above set forth, preferred construction, specific preferred arrangements of lens optics and mechanical construction have been set forth in detail in order to adequately illustrate the invention herein it will be understood that these specific arrangements and data are given by way of illustration only and not by way of limitation. The requirements are simply these:

For zooming the variator and the compensator must move as an integral unit relative to the erector and the relay lens assembly, which together comprise the fixed unit of the varifocal lens.

For close-up-focusing the variator must move with respect to the compensator, said movement not affecting the relative movement of variator and compensator, as integral unit with respect to the fixed integral unit consisting of erector and relay lens assembly, during the zoom to the extent of affecting the zoom-effect and the balanced optical relation between fixed and movable units of the entire varifocal lens unit.

Mechanically these adjustments of the lens members, with respect to each other, must be accomplished for both purposes, zoom and close-up-focusing, by the simple operation of mechanical means such as the zoom rod and the control shaft, which can be operated simultaneously, concurrently and jointly or also independently and separately, by means of one hand, to accomplish zooming and close-up-focusing simultaneously or separately and independently while the operator at all times has one "free" hand, which can be used to manipulate the camera and the carriage or to perform other needed operations totally independent of zooming or close-up-focusing or both.

Accordingly it must be understood, that the arrangement of zoom-rod and control shaft as specifically shown, the arrangement of the lens holding members etc., are simply illustrated as showing one preferred form of an arrangement adapted to accomplish the required and desired results in a satisfactory manner, solely shown for the purpose of illustration and not by way of limitation. Other mechanical means and arrangements adapted to accomplish the required movements of the movable lens members as requisite for focusing and zooming may be used and modifications in the mechanics and optics, as obvious to those skilled in the art may be made without thereby departing from the spirit of the present invention, which shall be limited by the scope of the appended claims.

We claim:

1. In a variable focal lens mount construction for a variable focal lens comprising a plurality of movable lens elements and fixed lens elements movable relative to each other for focal adjustment and zooming and comprising a main lens barrel and an adjusting-rod compartment, substantially parallel and adjacent thereto, said lens barrel provided with lens mounting means for said fixed lens elements and movable mounting means for said movable lens elements, the latter mounting means provided with connecting means adapted to cooperate with adjusting means for focusing and for zooming, said adjusting means consisting of an extensible, for zooming, and rotatable, for focusing, rod slideably arranged in said adjusting-rod compartment, whereby said movable lens elements are moved relative to the fixed lens elements for the purposes of focusing and zooming, by one single, hand-operable adjusting means.

2. In a varifocal lens construction in accordance with claim 1, a lens arrangement having the following values:

| Lens | Glass | $N_D$ | V | Radii | Thickness or Separation |
|---|---|---|---|---|---|
| Variator 10 | BSC | 1.517 | 64.5 | $R_1=+122.68$ $R_2=+939.28$ | $t_1=12.00$. $d_1=$ Variable from 5.17 to 80.17. |
| Erector 11 | DF | 1.605 | 37.9 | $R_3=-307.00$ $R_4=+61.71$ | $t_2=4.00$. $d_2=$ Variable from 87.50 to 12.50. |
| Compensator: 12 | DBC | 1.611 | 58.8 | $R_5=+71.50$ $R_6=-939.28$ | $t_3=8.50$. $d_3=$ Variable from 20.70 to 95.70. |
| Relay: 13 | DBC | 1.611 | 58.8 | $R_7=+45.41$ $R_8=-424.00$ | $t_4=6.00$. $d_4=9.50$. |
| Relay: 13x | DF | 1.621 | 36.2 | $R_9=-45.00$ $R_{10}=+45.00$ | $t_5=1.80$. $d_5=9.70$. |
| 13xx | DBC | 1.611 | 58.8 | $R_{11}=+1917.00$ $R_{12}=-36.43$ | $t_6=8.00$. $d_6=60.50$. |

Wherein: BSC=borosilicate crown; DF=dense flint; DBC=dense barium crown; $N_D$=index of refraction for sodium light; V=Abbé's dispersion number; R=radius of curvature; $t$=axial lens thickness; $d$=axial air spaces between lenses.

References Cited in the file of this patent

UNITED STATES PATENTS

| | | |
|---|---|---|
| 2,165,341 | Capstaff et al. | July 11, 1939 |
| 2,235,364 | Cramatzki | Mar. 18, 1941 |
| 2,454,686 | Back | Nov. 23, 1948 |
| 2,514,239 | Hopkins | July 4, 1950 |
| 2,566,485 | Cuvillier | Sept. 4, 1951 |

FOREIGN PATENTS

| | | |
|---|---|---|
| 536,706 | Great Britain | May 23, 1941 |